(12) United States Patent
Lich

(10) Patent No.: US 7,483,776 B2
(45) Date of Patent: Jan. 27, 2009

(54) APPARATUS FOR DETECTING A VEHICLE ROLLOVER

(75) Inventor: Thomas Lich, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 10/523,548

(22) PCT Filed: Mar. 11, 2003

(86) PCT No.: PCT/DE03/00768

§ 371 (c)(1), (2), (4) Date: Mar. 13, 2006

(87) PCT Pub. No.: WO2004/016484

PCT Pub. Date: Feb. 26, 2004

(65) Prior Publication Data

US 2006/0238026 A1    Oct. 26, 2006

(51) Int. Cl.
    *B60G 23/00*    (2006.01)
(52) U.S. Cl. .......... 701/38; 340/429; 340/440; 340/438; 340/442; 280/5.506
(58) Field of Classification Search .......... 303/191, 303/192; 701/93, 37, 38; 73/146; 340/901, 340/440, 429, 442–448, 438, 425.5; 280/5.502, 280/5.506, 5.507
See application file for complete search history.

(56) References Cited

U.S. PATENT DOCUMENTS

| | | | | |
|---|---|---|---|---|
| 5,071,259 A | * | 12/1991 | Metzger et al. ............ | 374/143 |
| 5,869,943 A | * | 2/1999 | Nakashima et al. ........ | 318/586 |
| 6,332,104 B1 | * | 12/2001 | Brown et al. ............. | 701/1 |
| 6,424,907 B1 | * | 7/2002 | Rieth et al. .............. | 701/124 |
| 6,438,464 B1 | * | 8/2002 | Woywod et al. ........... | 701/1 |
| 6,499,796 B1 | * | 12/2002 | Eenhoorn ............... | 296/187.06 |
| 6,604,025 B2 | * | 8/2003 | Ries-Mueller ............ | 701/1 |
| 6,618,656 B2 | * | 9/2003 | Kueblbeck et al. ........ | 701/45 |
| 6,799,092 B2 | * | 9/2004 | Lu et al. ................ | 701/1 |
| 2002/0095980 A1 | | 7/2002 | Breed et al. | |

FOREIGN PATENT DOCUMENTS

| | | |
|---|---|---|
| DE | 197 46 889 | 5/1998 |
| DE | 199 04 216 | 1/2000 |
| DE | 100 39 108 | 7/2001 |
| DE | 100 15 267 | 10/2001 |
| DE | 100 25 260 | 12/2001 |
| DE | 100 29 282 | 12/2001 |
| EP | 1 118 507 | 7/2001 |

OTHER PUBLICATIONS

Hecker F et al: "ESP—A New Electronic Safety System For Commercial Vehicles" Auto Technology, Vieweg Publishing, Wiesbaden, Germany, vol. 1, No. 6, Dec. 2001, pp. 52-55.
W. Krantz et al., "Estimation of Side Slip Angle using Measured Tire Forces", 2002-01-0969, SAE 2002 World Congress, Mar. 4-7, 2002, Detroit.

* cited by examiner

*Primary Examiner*—Robert A Siconolfi
*Assistant Examiner*—Mariano Sy
(74) *Attorney, Agent, or Firm*—Kenyon & Kenyon LLP

(57) ABSTRACT

An apparatus and a method for detecting a vehicle rollover are provided, which apparatus and method use the signals from tire sensors to determine the plausibility of the detection of a vehicle rollover.

11 Claims, 2 Drawing Sheets

APPARATUS FOR DETECTING A VEHICLE ROLLOVER

FIELD OF INVENTION

The present invention relates to an apparatus and method for detecting a vehicle rollover.

BACKGROUND INFORMATION

The SAE publication by W. Krantz et al.: Estimation of Side Slip Angle using Measured Tire Forces, 2002-01-0969, SAE 2002 World Congress, Mar. 4-7, 2002, Detroit, describes detecting a swerving movement using tire force sensors.

SUMMARY OF THE INVENTION

An exemplary apparatus and/or an exemplary method of the present invention for detecting a vehicle rollover may use tire sensors to detect a vehicle rollover. In particular, this may permit the determination of the plausibility of the detection of a rollover process using inertial sensors, such as, for example, yaw-rate and acceleration sensors. In this manner, an overall improvement in rollover detection may be provided.

The tire sensors may be configured as pressure sensors. Such pressure sensors may already be present and, by analyzing the pressure ratio of the tires on the opposite sides of the vehicle, a simple determination of the plausibility of a rollover about the longitudinal axis of the vehicle may be provided. A comparison of the pressure ratios between the front and the back pair of tires may provide a way of detecting a rollover along the transverse axis—in other words, the y axis—of the vehicle. In addition to or instead of this, an analysis of the temperature increase of a locking tire may be provided. Tires that are subjected to high loads in a rollover may have a much higher temperature than those that are on the side of the vehicle that lifts off the ground. Thus, here too, information indicating a vehicle rollover may be obtained by determining a ratio.

Information concerning the contact between the road surface and the tires may be obtained by analyzing the rotational-speed signal. Wheels that are rotating freely may behave differently than wheels that are locked or that are in contact with the road surface. Since the tire pressure may also be determined from the rotational-speed signal, redundant information may be obtained, so that the rotational-speed measurement may be provided as an alternative or instead of an absolute pressure measurement.

DETAILED DESCRIPTION

Figure 1:
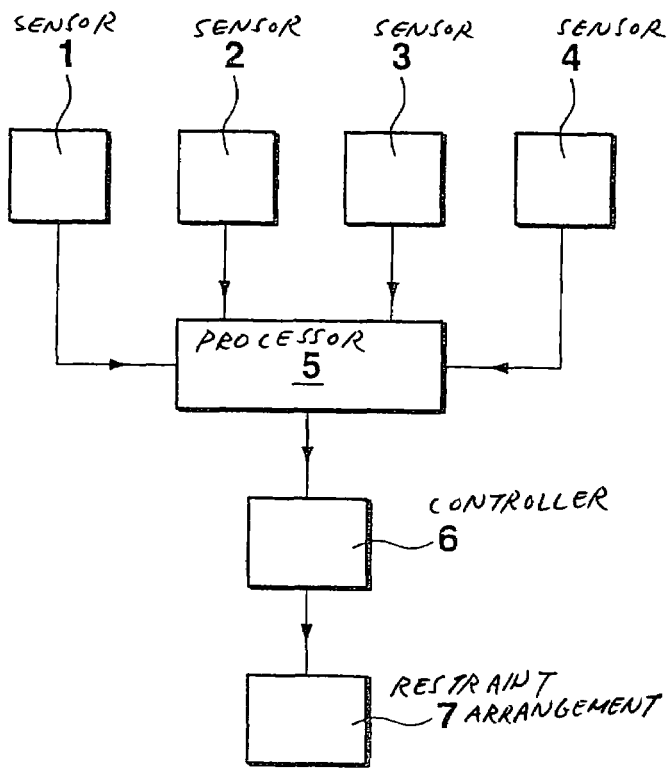
FIG. 1 shows a schematic diagram of an exemplary apparatus of the present invention.

In 1998 half of all fatal single-vehicle accidents in the U.S.A. may have been attributable to a rollover. Vehicle rollovers may constitute about 20% of all vehicle accidents.

Concepts for detecting a rollover process were developed to detect such a vehicle rollover at an early time. This may ensure that safety equipment such as seat-belt tensioners, head airbags, and roll bars may be activated promptly, thereby reducing the risk of injury. Such methods for detecting rollovers may be based on sensor signals from inertial sensors. These sensors may include, for example, yaw-rate sensors, inclination sensors, as well as acceleration sensors. The yaw-rate sensor determines the rotational velocity about the longitudinal axis of the vehicle utilizing the gyroscopic principle. The acceleration sensors also measure vehicle acceleration in the transverse and vertical direction. The yaw rate may be calculated in a main procedure. The type of rollover may be detected using the measured values obtained from the acceleration sensors. In addition, these values may be used to check plausibility. If the yaw-rate method detects a rollover, the safety equipment is activated, but only if it is simultaneously enabled by the plausibility check.

One feature of this approach is that the time required to trigger a response may be too late in certain circumstances since, in the case of what is referred to as a soil trip, due to the locking of the vehicle's wheels on one side and to the resulting force moment, the occupants are thrown toward the window glass before the vehicle detects the rollover process.

An exemplary apparatus and an exemplary method of the present invention for detecting a vehicle rollover may provide a faster process for determining the plausibility of the detection of a vehicle rollover. This earlier detection may be accomplished by monitoring the condition of the vehicle on the road surface. In specific terms this means that the tires on one side of the vehicle are not in contact with the road surface in a rollover process. There may be several methods to use tire sensors to monitor contact with the road surface. One method, for example, is to monitor the tire pressure. When both tires on one side of the vehicle lose contact with the road surface, a different pressure ratio results in these tires compared to those on the other side of the vehicle that have not lost contact with the road. Likewise, information may be obtained from monitoring the relative pressure, namely the pressure at the front right and that at the rear right, and via the actual absolute pressure gradient of the pressure. In addition, the temperature may be used if the sensor supports this. In this case, it may be important to know that a significant temperature increase is present with locking tires. However, this effect may be highly dependent on the road surface or the terrain. Nevertheless, this may represent an alternative or an additional method of checking the plausibility of the detection of a rollover.

A further alternative or additional exemplary embodiment for detecting road surface contact is to analyze the rotational-speed signals from the individual tires. As described above, wheels that may rotate freely behave differently than those wheels that are locked or are in contact with the road. Since the tire pressure may also be determined from the rotational-speed signal, it may be possible in this case to generate redundant information, so that the absolute pressure measurement might not need to be performed.

A sensor used to obtain tire pressure data may utilize the following principle: A sensor mounted on the interior on the tire valve measures the tire pressure and the tire temperature at regular intervals. The data is then transmitted to a central control unit. The data may be transferred by a wireless arrangement. Theoretically the data may be transferred inductively. In particular, passive sensors may also be used.

An analysis for detecting a vehicle rollover may be performed in various ways, including the following:

$T\_fl$:=Tire pressure front left
$T\_fr$:=Tire pressure front right
$T\_rl$:=Tire pressure rear left
$T\_rr$:=Tire pressure rear right When the vehicle is operating normally—in other words no soil trip or rollover process is occurring—the following ratio results:

$$(T\_fl * T\_rl)/(T\_fr * T\_rr) \sim 1.0$$

Due to a shift in pressure to one side of the vehicle when, the right side of the vehicle leaves the road surface, the following ratio results:

$$(T\_fl * T\_rl)/(T\_fr * T\_rr) \gg 1.0$$

Since the pressure on the right side decreases—in other words, the load on the tires decreases—and a load is applied to the tires on the left side—in other words, the pressure in the tire increases according to tendency—a disproportion results relative to the normal operation. If the tires leave the surface on the left side, this ratio approaches 0, in other words the ratios are inverted:

$$(T\_fl * T\_rl)/(T\_fr * T\_rr) \ll 1.0$$

The triggering time may be improved decisively by establishing a link to the yaw-rate sensor via logical operations.

Any other information or method of calculating this information may be used. For example, diagonal ratios may be analyzed.

FIG. 1 shows an exemplary apparatus of the present invention in a schematic diagram. The diagram shows four tire sensors 1 to 4, each of which is connected to a processor 5. Processor 5 is connected to a trigger-circuit controller 6, which in turn is connected to a restraint arrangement 7. For the sake of simplicity, inertial sensors, such as acceleration and yaw-rate sensors, were left out here in order to focus solely on the detection of a vehicle rollover according to the invention. Here, tire sensors 1 to 4 already supply digital signals to processor 5. Alternatively, external analog-digital converters may be provided to digitize the sensor signals. As described above, based on the tire-pressure ratios or the rotational-speed ratios or the temperature ratios, processor 5 determines whether one side of the vehicle or the front of the vehicle or the rear of the vehicle is lifting off the road. If so, this is an indication of vehicle rollover. If this is the case, then processor 5 enables trigger device 6 so that, if the inertial sensors also detect a vehicle rollover, the restraint arrangement 7 may be activated.

Figure 2:
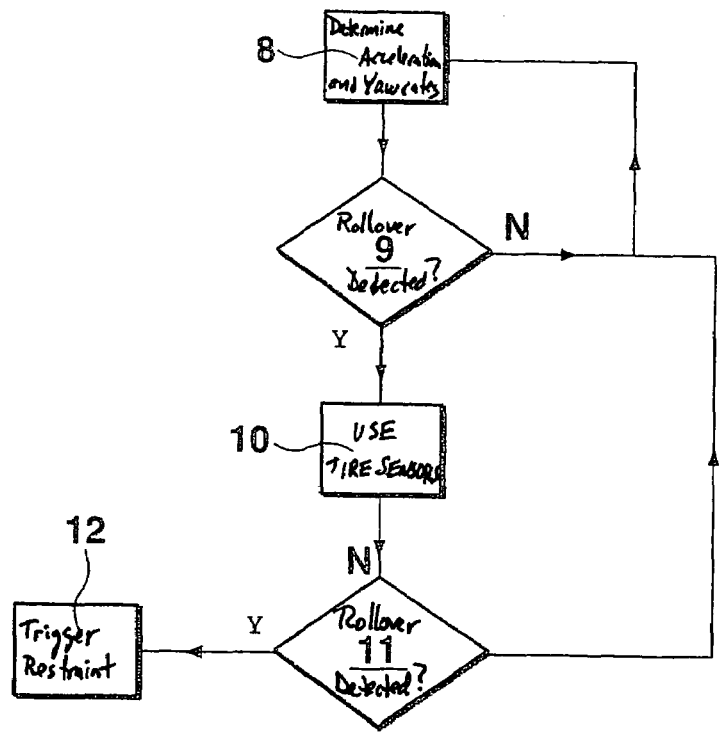
FIG. 2 shows a flowchart of an exemplary method of the present invention.

FIG. 2 shows a flowchart of an exemplary method of the present invention. In method step 8, the acceleration and the yaw rates in the vehicle are determined using inertial sensors. In method step 9, processor 5 checks these measured values and compares them with specified threshold values, which may be calculated adaptively. If a vehicle rollover is detected using the comparison in method step 9, then the sequence continues on to method step 10 to determine via tire sensors 1-4 whether they are also detecting a vehicle rollover. However, if it was found in method step 9 that the inertial sensors are not detecting a vehicle rollover, the sequence returns to method step 8, and measuring continues. On the other hand, if a vehicle rollover is indicated based on the measured values from the inertial sensors, then in method step 11 the measured signals from tire sensors 1 to 4 are analyzed by processor 5. If, based on these measured values, processor 5 detects that they are also indicating a vehicle rollover, then the sequence skips to method step 12 and the restraint arrangement 7 is triggered by trigger-circuit controller 6. However, if in method step 11 it is found that tire sensors 1-4 do not indicate a vehicle rollover, the sequence returns to method step 8, and measurement continues with the inertial sensors.

Figure 3:
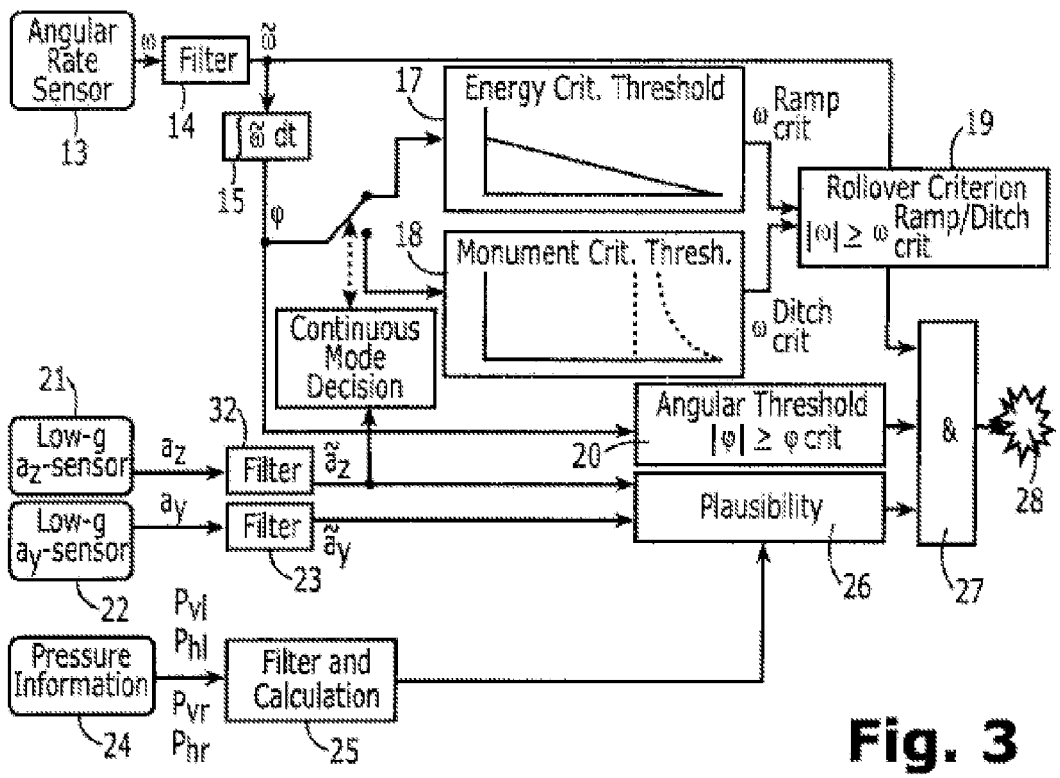
FIG. 3 shows a schematic diagram of an exemplary method of present invention.

FIG. 3 shows an exemplary method of the present invention in detail using a block diagram. A yaw-rate sensor 13 sends the measured yaw rate to a filter 14. From filter 14, this filtered yaw rate is received by an integrator 15 and by a comparator 19. Comparator 19 compares the value of the filtered yaw rate with a specified yaw rate calculated from blocks 17 and 18. If it is recognized in block 19 that the filtered yaw rate is higher than this threshold, a logical 1 is sent to an AND gate 27 that is used to generate the triggering decision.

Starting from integrator 15, the integrated yaw rate, in other words the angle of rotation, is used either to generate an energy threshold or to generate a torque threshold. This is decided by a block 16 that operates a switch that switches back and forth between these two blocks 17 and 18. This is controlled by block 16 depending on a signal coming from a filter 22, this signal being the filtered acceleration signal in the vertical direction of the vehicle. This signal is determined by sensor 21, an acceleration sensor for low accelerations. Integrator 15 not only transmits the angle of rotation to generate the threshold for the rollover criterion, it also transmits it to a comparator 20, which compares the angle of rotation with an angular threshold.

If it is determined in comparator 20 that the value of the integrated angle exceeds the specified threshold, a logical 1 is sent to AND gate 27. The filtered acceleration in the vertical direction of the vehicle is sent from filter 22 not only to block 16, but also to block 26, which is responsible for establishing the plausibility of the rollover decision. The acceleration in the vehicle transverse direction is also used for this, and is transmitted from a filter 23 to plausibility 26. Filter 23 receives its signal from a sensor 22, which senses the acceleration in the vehicle transverse direction. According to the invention, a signal that is a function of the tire sensors is also passed to the plausibility function. This is provided by block 25, which handles filtering and calculations. Block 25 receives its signal from tire sensors 24, and only if plausibility function 26 also generates a logical 1, then AND gate 27 emits a logical 1, so that a triggering decision 28 will then be present.

Figure 4:
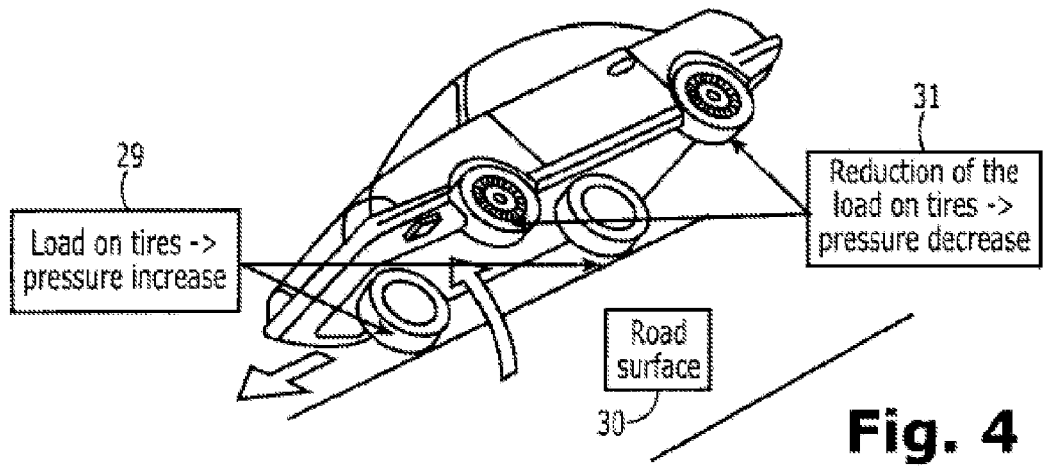
FIG. 4 shows a rollover process about the longitudinal axis of the vehicle.

FIG. 4 shows a typical case of a vehicle rollover about the vehicle longitudinal direction. A vehicle 33 is located on a road surface 30 and it experiences a rollover about the longitudinal direction of the vehicle. In this context, tires 29 are characterized by a pressure increase as a result of the one-sided load; while tires 31 that are off the ground are relieved of their load and therefore also experience a decrease in pressure. It is therefore clear that an indication of vehicle rollover may be provided by a simple comparison of the different pressures. However, the tire sensors do not produce a conclusive signal to indicate that a vehicle rollover is actually taking place; they may only determine that the tires have lifted off the road surface. Therefore, the signals from the tire sensors are mainly suitable for providing a check of the plausibility of a detection of a vehicle rollover by inertial sensors.

What is claimed is:

1. An apparatus for determining a vehicle rollover, comprising:
  at least one inertial sensor for detecting a potential vehicle rollover;
  a plurality of tire sensors; and
  an arrangement that uses signals from the plurality of tire sensors to determine a plausibility of the detection of the potential vehicle rollover
  wherein the plausibility determination includes:
    measuring a tire pressure for each tire on the vehicle;
    calculating a first value by multiplying the pressure measurements for each tire on a first side of the vehicle by each other;

calculating a second value by multiplying the pressure measurements for each tire on a second side of the vehicle by each other;

calculating a ratio of the first value to the second value; and determining the plausibility based at least in part on the ratio.

2. The apparatus of claim 1, wherein the plurality of tire sensors are configured as pressure sensors.

3. The apparatus of claim 1, wherein the plurality of tire sensors are configured as rotational speed sensors.

4. The apparatus of claim 1, wherein the plausibility determination is based at least in part on an extent to which the ratio deviates from a value of 1.

5. An apparatus for determining a vehicle rollover, comprising:

an angular rate sensor to measure an angular rate, wherein a potential vehicle rollover is determined at least in part by the measured angular rate;

a vertical acceleration sensor for measuring a vehicle acceleration in a vertical direction;

a horizontal acceleration sensor for measuring an acceleration in a transverse direction; and a plurality of tire sensors;

wherein:

a plausibility of the detection of the potential vehicle rollover is determined at least in part based on the vertical acceleration, the horizontal acceleration, and signals from the plurality of tire sensors;

the apparatus is configured to output an indication of a vehicle rollover for performance of a safety measure, the output of the indication being conditional upon that (a) the detection of the potential vehicle rollover is determined to be plausible by the plausibility determination, (b) an integrated angular rate, which is obtained by integrating the measured angular rate, is over a first critical number, and (c) the angular rate is over a second critical number;

the second critical number is either an energy threshold or a torque threshold; and the second critical number is based on the integrated angular rate.

6. The apparatus of claim 5, wherein the plurality of tire sensors are configured as temperature sensors.

7. The apparatus of claim 5, wherein the plurality of tire sensors are configured as pressure sensors.

8. The apparatus of claim 5, wherein the plurality of tire sensors are configured as rotational speed sensors.

9. A method of determining a vehicle rollover, comprising:

detecting a potential vehicle rollover using signals from at least one inertial sensor; and determining a plausibility of the detection of the potential vehicle rollover using signals from a plurality of tire sensors;

wherein the plausibility determination includes:

measuring a tire pressure for each tire on the vehicle;

calculating a first value by multiplying the pressure measurements for each tire on a first side of the vehicle by each other;

calculating a second value by multiplying the pressure measurements for each tire on a second side of the vehicle by each other;

calculating a ratio of the first value to the second value; and determining the plausibility based at least in part on the ratio.

10. The method of claim 9, wherein the plausibility determination is based at least in part on an extent to which the ratio deviates from a value of 1.

11. A method of determining a vehicle rollover, comprising:

measuring an angular rate;

detecting a potential vehicle rollover at least in part by the measured angular rate;

measuring a vehicle acceleration in a vertical direction;

measuring an acceleration in a transverse direction;

determining a plausibility of the detection of the potential vehicle rollover at least in part based on the vertical acceleration, the horizontal acceleration, and signals from a plurality of tire sensors;

outputting an indication of a vehicle rollover for performance of a safety measure, the output of the indication being conditional upon that (a) the detection of the potential vehicle rollover is determined to be plausible by the plausibility determination, (b) an integrated angular rate, which is obtained by integrating the measured angular rate, is over a first critical number, and (c) the angular rate is over a second critical number, wherein the second critical number is either an energy threshold or a torque threshold and is based on the integrated angular rate.

* * * * *